Figure 1:
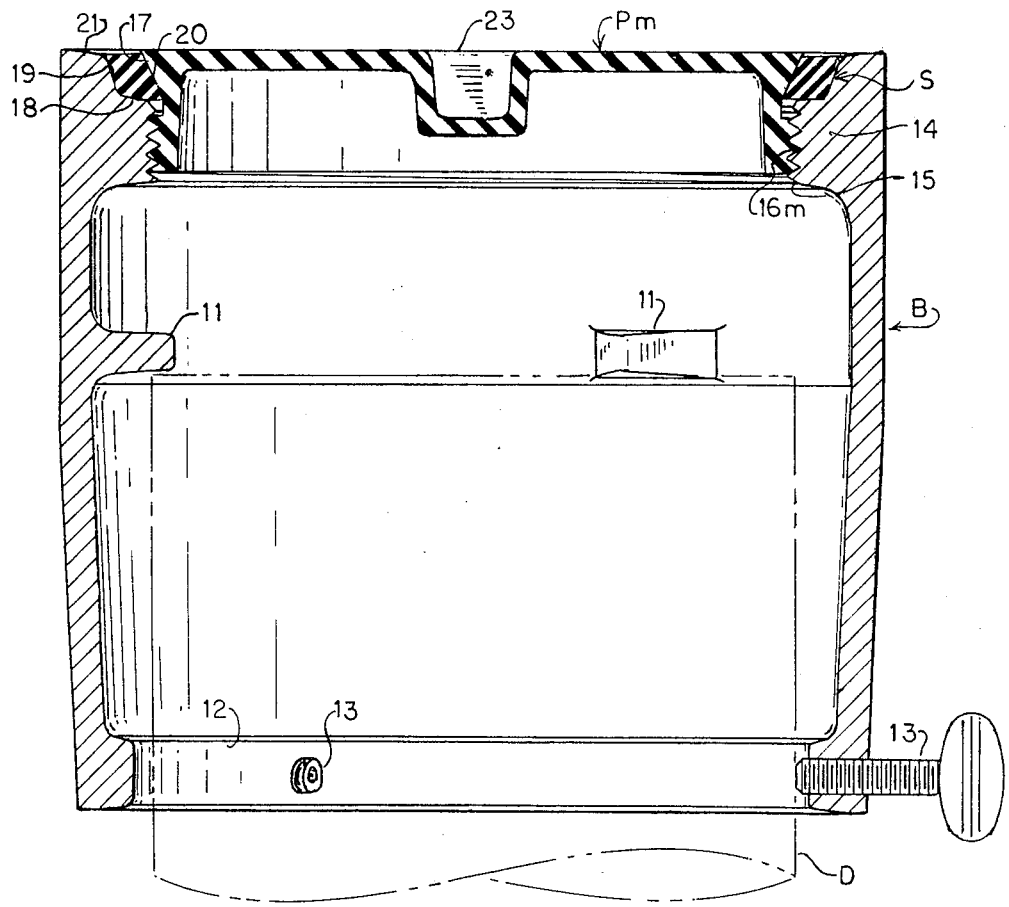

United States Patent [19]

Polster et al.

[11] 3,993,102

[45] Nov. 23, 1976

[54] CLEANOUT FITTING COMBINATION

[75] Inventors: Lewis H. Polster, Shaker Heights, Ohio; George J. Flegel, Michigan City, Ind.

[73] Assignee: Josam Manufacturing Co., Michigan City, Ind.

[22] Filed: Nov. 5, 1974

[21] Appl. No.: 521,074

[52] U.S. Cl. ............................. 138/89; 220/304; 277/170
[51] Int. Cl.² ........................................ F16L 55/10
[58] Field of Search .................... 138/89; 220/304; 277/170, 169

[56] References Cited
UNITED STATES PATENTS

| | | | |
|---|---|---|---|
| 1,436,331 | 11/1922 | Ayling | 138/89 X |
| 2,046,700 | 7/1936 | Sander | 138/89 |
| 2,194,147 | 3/1940 | Mauser | 220/304 X |
| 2,689,058 | 9/1954 | Schmid | 220/304 |
| 3,039,494 | 6/1962 | Bradley | 138/89 |
| 3,157,203 | 11/1964 | Ver Nooy | 138/89 |
| 3,255,916 | 6/1966 | Rice | 220/304 |
| 3,434,346 | 3/1969 | Demyon | 220/304 X |
| 3,893,487 | 7/1975 | Engelking | 138/89 |

Primary Examiner—Richard C. Queisser
Assistant Examiner—Charles Gorenstein
Attorney, Agent, or Firm—P. D. Golrick

[57] ABSTRACT

A plumbing cleanout fitting combination, of a body having a plug-closed access opening provided with a female standard tapered pipe thread, and a somewhat counter-bore-like seal seat around the outer margin of the opening; an elastomeric compressible gasket or seal ring in the seat; and a plug having a shoulder at its outer end to sealingly compress the ring and, on its inner end, an opening-engaging male thread, of pitch corresponding to the female thread, the male being either a standard straight or modified tapered pipe thread, diametrically proportioned to the female to enable the plug to be screwed in to seal without thread interference; whereby the body can accept an optional plug with a male standard tapered pipe thread sealing by tapered thread engagement without sealing gasket.

14 Claims, 2 Drawing Figures

U.S. Patent  Nov. 23, 1976  3,993,102

CLEANOUT FITTING COMBINATION

For plumbing fittings having a removable plug closed body, such as cleanout fitting attached to and terminating a drainage or sanitary line branch stub, the choice of sealing plug is usually dictated either by specific physical conditions expected to be encountered at the point of use or by local building code requirements of the place of installation.

In some situations the body is to be closed by a simple plug having a tapered male thread which effects a closure seal by its tight-screwed engagement with a corresponding tapered female thread of the body opening; while in other situations the closure is to be provided by a plug shouldered to engage and sealingly compress a gasket against a seat formed about the body opening; in which latter case, straight threads on plug and body have been used so that the plug may be screwed, without thread interference, into the body opening sufficiently to develop sealing forces on the gasket.

Hence, to supply the demand for what is basically the same fitting in structure or function, even for a given size or capacity specification, the manufacturer produces and inventories, and those in the manufacturer's distribution system will inventory, two actually distinct complete product items and parts therefor, namely, two different bodies, two different plugs and as well gasketing for one of the plugs.

Inasmuch as the fitting body is usually a grey iron casting and bulky and heavy for the product value involved, the disadvantages of having to produce the distinct bodies for and to maintain the dual inventory are obvious.

By the present invention, a fitting combination is provided in the first instance wherein a plug shouldered for seal engagement and a corresponding seal are used with a body member having at its plugged opening a female tapered thread, say a standard taper pipe thread and certain structure affording a seal seat; while the plug has, beneath its shoulder, a male thread, either a straight or a modified taper thread, which will not develop thread interference in plug advance to a gasket-sealed condition with the body. However, by virtue of the tapered female thread of the body opening, optionally with the same body there may be substituted and used an ungasketed plug with a corresponding tapered male thread, e.g., standard taper pipe threads being used for male and female elements to produce the requisite sealed closure.

Thus by the structure of this combination of body and sealed plug, only one body type is required, the needs of the two use or application situations being met solely by the differences in relatively quite smaller parts, namely, the gasketed and non-gasketed plugs. This is decidedly advantageous in the tooling, production scheduling, inventory and warehousing aspects of the manufacturer's operations, and in inventory handling of others in the distribution channel.

The general object of the present invention is to provide an improved form of a cleanout or access fitting type plumbing fitting combination, especially in the gasketed-plug type, adapted for providing a sealed termination for an access stub branch on a drainage line or a sanitary pipe.

Another object of the invention is to provide a fitting combination of the character described of the body which is adaptable for optional use of either of two accepted forms of removable plugs.

Another object is the provision of a fitting of the character described, wherein a sturdy reliable structure is provided for accommodation of two distinct approved plug types, enabling the installing mechanic to use a situation-required plug, and the manufacturer or dealer more readily to supply combinations with plug closures as locally required without need to make and/or stock the entire structure combination for each of the two types to meet probable demands for each.

Figure 2:
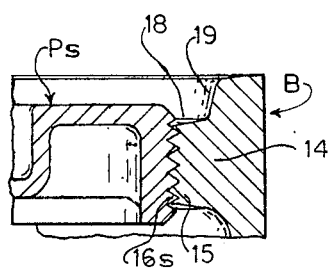

Other objects and advantages will appear from the following description and the drawings wherein:

FIG. 1 is a vertical longitudinal or axial section of a cleanout fitting as one embodying the invention; and FIG. 2 is a fragmentary detail view.

In the drawing FIG. 1 appears a cleanout fitting combination comprised of the metal body member B of cast iron or the like, to be secured and sealed through appropriate means as a termination element, on drain pipe branch stub D, shown in dashed outline, and a closure plug member Pm screwed to the top end of the body, and in FIG. 1 sealed by appropriate gasket means S under forces developed by the screwed plug engagement in the body.

The body structure required for purposes of the invention is such that the body member may have various conventional means for joining the body to the stub, and if desired for anchoring the body in the environment, or for clamping flashing to the body; and of the latter two, since not dictated by novel aspects of the invention, there is no drawing representation.

However, the specific structure of body B is shown as affording a caulked joint connection with the pipe stub end as conventional for cast iron drainage or sewer pipe. Thus the body has integral projecting inward lugs 11 as stops for the stub end, and at the bottom, surrounding the pipe-receiving opening, an inward lip 12 having three equi-spaced radially tapped holes with respective thumb screws or wing type set screws 13; conventionally defining an annular caulking receiving recess between the pipe and the surrounding body bottom portion.

Structure specifically pertinent to the invention is present at the body top region, where a thick inward circumferential lip 14, spaced or offset inwardly from the end to afford space for seal element S, is female-threaded with standard taper pipe (e.g., NPT) threads at 15 to receive the threaded plug Pm with a different male thread 16m, to be explained.

The seal element S, between the body and plug, is a ring of neoprene or other appropriate resilient elastomeric gasket material adapted to be sealingly compressed in the annular recess defined between a circumferential tapered shoulder 17 of the plug, and the seal seat formed in the body endwise of the threaded lip 14 by a more or less horizontal outer annular side or face 18 of the lip and a female taper surface 19 flaring up and out from 18 to the body end face 21. Preferably to eliminate an edge on which seal drainage might occur, the shoulder 19 rounds outwardly to merge into the body top end 21. The slope shoulder 17 tapers in to a diameter preferably equal to or slightly smaller than the plug male thread root diameter just beneath a short clearance or relief 20 between thread and shoulder.

The plug Pm, as also the plug Ps hereinafter adverted to conventionally has in its exposed flat top surface a tool-accepting slot recess 23 as conventionally provided for tool driving and removal loosening purchase; and both may be conveniently molded to threaded finished form in a tough plastic such as DELRIN of DuPont or an ABS, or be cast of metal.

Though having the same pitch as the NPT female thread 15, the male thread 16m in the plug Pm is either a straight pipe thread or a tapered thread modified to have the pitch diameter smaller than that of the thread 15 over the corresponding lengths intended to be engageable, that is, offering a loose engagement; so that, without the usual standard taper thread interference which, in developing a seal in the tightening of a standard taper pipe joint, obstructs axial advance, in either case, the plug may be screwed in freely to compress the ring S into the requisite sealed relation. With a straight male thread, its pitch diameter is, of course, selected to correspond to that of the innermost female thread turn.

With the above described structure available, the same body B, since having a standard female taper pipe thread 15, may accent an unshouldered plain plug, as Ps in fragmentary FIG. 2, having a standard (NPT) tapered male pipe thread 16s, so that in conventional fashion, the plug P, may be screwed in tight to a sealed relation.

As fittings having openings with removable plugs are produced in large numbers, especially for low pressure service where the thread-to-thread seal is sufficient as in cleanouts, the value of the invention is appreciable in providing in the fitting combination a body having the tapered threaded opening adapted to receive a so-called countersunk plug correspondingly taper-threaded for a thread-to-thread seal, the body also having a seal seat surrounding the outer side of the opening adapted to seat a seal ring of form and composition appropriate to a shouldered form of a plug with non-interfering thread.

What is claimed is:

1. A plumbing fitting combination, of a hollow body adapted to be joined to a pipe and having a round, female-threaded, body opening, with a removable plug for closing that body opening, said body having a formation surrounding and defining the opening provided by
    a circumferential inward thick lip threaded with a female taper thread, and
    a circumferential seal seat on the outer side of said lip;
    a compressible seal ring received by said seat; and
    a removable shouldered plug for said opening having at its outer end a circumferential shoulder adapted to engage with and to apply body-to-plug sealing forces to the seal ring upon inward axial advance of the plug, and running from its inner end, a short length of male thread of the same pitch as the female thread for screwed plug engagement in the body opening; the male thread being diametrically proportioned, along its length relative to the female thread for a non-interfering threaded engagement enabling axial plug advance to required compression of the seal ring,
    whereby with the fitting body, there may be optionally used a plug having a male taper thread corresponding to the female thread thereby to effect a thread-to-thread seal between the screwed-in plug and the body.

2. The fitting combination of claim 1, wherein
said female thread is a standard taper pipe thread, and said male thread is a standard straight pipe thread, with pitch diameter corresponding to the pitch diameter of the innermost female thread turn.

3. The fitting combination of claim 1, wherein
said female thread is a standard taper pipe thread, and said male thread is a taper pipe thread modified to afford a loose engagement with the female thread, enabling free turning for a plug axial inward advance to compress said seal.

4. The fitting combination of claim 1, wherein
said seat has a counterbore-like form and is provided by an axially outer side of said lip and a surface flaring radially and axially outward away from the lip outer side to provide a female tapered seat portion; and
the said circumferential shoulder on the outer end of the said shouldered plug is an inwardly convergent male tapered shoulder with taper corresponding to the female taper of the seat.

5. The fitting combination of claim 4, wherein
said tapered shoulder on the said shouldered plug tapers inwardly to a diameter smaller than the root diameter of the adjacent end turn of the plug thread; there being a clearance relief from the inner end of the plug shoulder taper to the said end turn.

6. The fitting combination of claim 1, adapted by the configuration of said body to serve for a cleanout fitting, and wherein said body has an integral hollow cylindrical outer end portion receiving the closure plug, and
    said formation is constituted by said lip being spaced inward from the outer end of the cylindrical portion and defining, with the inside surface of the outboard part of the cylindrical portion, a counterbore-like said seat.

7. The fitting combination of claim 6, wherein
said female thread is a taper thread, and
said male thread is a straight thread, with pitch diameter corresponding, with free turning clearance, to the pitch diameter of the innermost female thread turn.

8. The fitting combination of claim 6, wherein
said female thread is a taper thread, and
said male thread is a taper thread modified to afford a loose engagement with the female thread, enabling free turning for a plug axial inward advance to compress said seal.

9. For use in a plumbing fitting combination, of a hollow body adapted to be joined at one end to a pipe and at the other end having a round, female-threaded, body opening, with a removable plug for closing that body opening;
    an improved said body having said opening threaded with a multi-turn female taper thread adapted to receive a plug correspondingly male taper threaded to make a thread-to-thread seal, and an internal annular end formation surrounding the opening outwardly of said female thread and defining a circumferential seal seat at the outer end of said female thread;
    said seat being adapted to receive entirely and support a seal ring for compression by a shouldered removable plug having at the plug outer end a circumferential shoulder adapted to engage with and to apply body-to-plug sealing forces to the seal ring upon inward axial advance of the plug, and, running from the plug inner end, a short multi-turn length of male thread of the same pitch as the female thread and diametrically proportioned, along its length, relative to the female thread for a non-interfering threaded engagement, whereby with the fitting body, there may be optionally used either a non-gasketed plug having a male tapered thread corresponding to the female thread to effect a thread-to-thread seal between the screwed-in plug and the body, or a gasketed plug with a non-interfering thread and gasketed by a said seal ring.

10. As a plumbing fitting combination, a body as described in claim 9 and wherein said female thread is a tapered pipe thread and, a said gasketed plug male threaded with a straight pipe thread with pitch diamter corresponding to the pitch diameter of the innermost female thread turn.

11. As a plumbing fitting combination, a body as described in claim 9 wherein said female thread is a tapered pipe thread and, a said gasketed plug male-threaded with a taper pipe thread modified to afford a loose engagement with the female thread, enabling free turning for a plug axial inward advance to compress said seal.

12. As a plumbing fitting combination, a body as described in claim 9 and wherein said seat has a counter-bore-like form and is provided by a body internal shoulder on an axially outer side of said female thread and a surface flaring radially and axially outward away from the body shoulder to provide a female tapered seat portion, and a gasketed plug whereof the said circumferential shoulder on the outer end is an inwardly convergent male tapered shoulder with taper corresponding to the female taper of the seat.

13. The fitting combination of claim 12, wherein said tapered shoulder on the said gasketed plug tapers inwardly to a diameter smaller than the root diameter of the adjacent end turn of the plug thread, there being a clearance relief from the inner end of the plug shoulder taper to the said end turn.

14. In the fitting combination of claim 9, said body being adapted in configuration to serve for a cleanout fitting, said body having an intergral hollow cylindrical outer end portion for receiving the closure plug, and said formation constituted by a lip being spaced inward from the outer end of the cylindrical portion and defining, with the inside surface of the outboard part of the cylindrical portion, a counter-bore-like said seat.

* * * * *